(12) United States Patent
Bird

(10) Patent No.: US 9,254,058 B2
(45) Date of Patent: Feb. 9, 2016

(54) DISPENSING ASSEMBLY FOR A REFRIGERATOR APPLIANCE

(71) Applicant: General Electric Company, Schenectady, NY (US)

(72) Inventor: Christopher Francis Bird, Louisville, KY (US)

(73) Assignee: General Electric Company, Schenectady, NY (US)

(*) Notice: Subject to any disclaimer, the term of this patent is extended or adjusted under 35 U.S.C. 154(b) by 163 days.

(21) Appl. No.: 14/010,605

(22) Filed: Aug. 27, 2013

(65) Prior Publication Data

US 2015/0060490 A1 Mar. 5, 2015

(51) Int. Cl.
| B65B 1/04 | (2006.01) |
| A47J 31/46 | (2006.01) |
| A47J 31/44 | (2006.01) |
| F25D 23/12 | (2006.01) |

(52) U.S. Cl.
CPC ............ *A47J 31/465* (2013.01); *A47J 31/4489* (2013.01); *F25D 23/126* (2013.01); *F25D 2400/02* (2013.01)

(58) Field of Classification Search
CPC ...... F25D 23/12; F25D 23/028; A47J 31/465; A47J 31/4489
See application file for complete search history.

(56) References Cited

U.S. PATENT DOCUMENTS

| 2009/0252855 A1* | 10/2009 | Ewald ................... A23L 1/0121 426/614 |
| 2010/0066226 A1 | 3/2010 | Luisi et al. |
| 2013/0104586 A1* | 5/2013 | Krause ..................... B67D 1/07 62/275 |
| 2014/0123858 A1* | 5/2014 | Rellis ....................... A47J 31/46 99/293 |

FOREIGN PATENT DOCUMENTS

| KR | 20060106140 | 10/2006 |
| KR | 2007106249 | 11/2007 |

* cited by examiner

Primary Examiner — Jason K Niesz
(74) Attorney, Agent, or Firm — Dority & Manning, P.A.

(57) ABSTRACT

A dispensing assembly for a refrigerator appliance is provided. The dispensing assembly includes a tank that defines a fluid chamber and a heating element for heating fluid within the fluid chamber. An inlet conduit directs liquid into the fluid chamber, a first outlet conduit directs liquid out of the fluid chamber, and a second outlet conduit directs gas out of the fluid chamber. The dispensing assembly also includes valves for regulating fluid flow through the inlet conduit and the first and second outlet conduits.

10 Claims, 4 Drawing Sheets

DISPENSING ASSEMBLY FOR A REFRIGERATOR APPLIANCE

FIELD OF THE INVENTION

The present subject matter relates generally to refrigerator appliances and dispensing assemblies for the same.

BACKGROUND OF THE INVENTION

Certain refrigerator appliances include a dispenser for directing ice from the refrigerator's ice maker and/or liquid water to the dispenser. A user can activate the dispenser to direct a flow of ice or liquid water into a cup or other container positioned within the dispenser. Liquid water directed to the dispenser is generally chilled or at an ambient temperature. However, certain refrigerator appliances also include features for dispensing heated liquid water.

Heated liquid water can be used to make certain beverages, such as coffee or tea. Refrigerators equipped to dispense heated liquid water can assist with making such beverages. However, certain coffee drinks, such as cappuccino and café mocha, include steamed milk. Such coffee drinks have become increasingly popular, but producing or making steamed milk can be difficult or tedious.

Accordingly, a refrigerator appliance with features for generating heated gas, such as steam, would be useful. In particular, a refrigerator appliance with features for generating steam and directing such steam to a dispenser of the refrigerator appliance would be useful.

BRIEF DESCRIPTION OF THE INVENTION

The present subject matter provides a dispensing assembly for a refrigerator appliance. The dispensing assembly includes a tank that defines a fluid chamber and a heating element for heating fluid within the fluid chamber. An inlet conduit directs liquid into the fluid chamber, a first outlet conduit directs liquid out of the fluid chamber, and a second outlet conduit directs gas out of the fluid chamber. The dispensing assembly also includes valves for regulating fluid flow through the inlet conduit and the first and second outlet conduits. Additional aspects and advantages of the invention will be set forth in part in the following description, or may be apparent from the description, or may be learned through practice of the invention.

In a first exemplary embodiment, a refrigerator appliance is provided. The refrigerator appliance includes a cabinet that defines a chilled chamber for receiving food or beverage items for storage. The cabinet also defines an opening for accessing the chilled chamber. A door is rotatably mounted to the cabinet at the opening of the cabinet. The door defines a dispenser recess. The refrigerator appliance also includes a dispensing assembly. The dispensing assembly includes a tank that defines a fluid chamber and a heating element configured for heating fluid within the fluid chamber of the tank. An inlet conduit is configured for directing liquid into the fluid chamber of the tank. A first outlet conduit is configured for directing liquid out of the fluid chamber of the tank to the dispenser recess of the door, and a first outlet valve is configured for regulating a flow of liquid through the first outlet conduit out of the fluid chamber of the tank. A second outlet conduit is configured for directing gas out of the fluid chamber of the tank to the dispenser recess of the door, and a second outlet valve is configured for regulating a flow of gas through the second outlet conduit out of the fluid chamber of the tank.

In a second exemplary embodiment, a dispensing assembly for a refrigerator appliance is provided. The dispensing assembly includes a tank that defines a fluid chamber and a heating element configured for heating fluid within the fluid chamber of the tank. An inlet conduit is configured for directing liquid into the fluid chamber of the tank, and an inlet valve is configured for regulating a flow of liquid through the inlet conduit into the fluid chamber of the tank. A first outlet conduit is configured for directing liquid out of the fluid chamber of the tank, and a first outlet valve is configured for regulating a flow of liquid through the first outlet conduit out of the fluid chamber of the tank. A second outlet conduit is configured for directing gas out of the fluid chamber of the tank, and a second outlet valve is configured for regulating a flow of gas through the second outlet conduit out of the fluid chamber of the tank.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
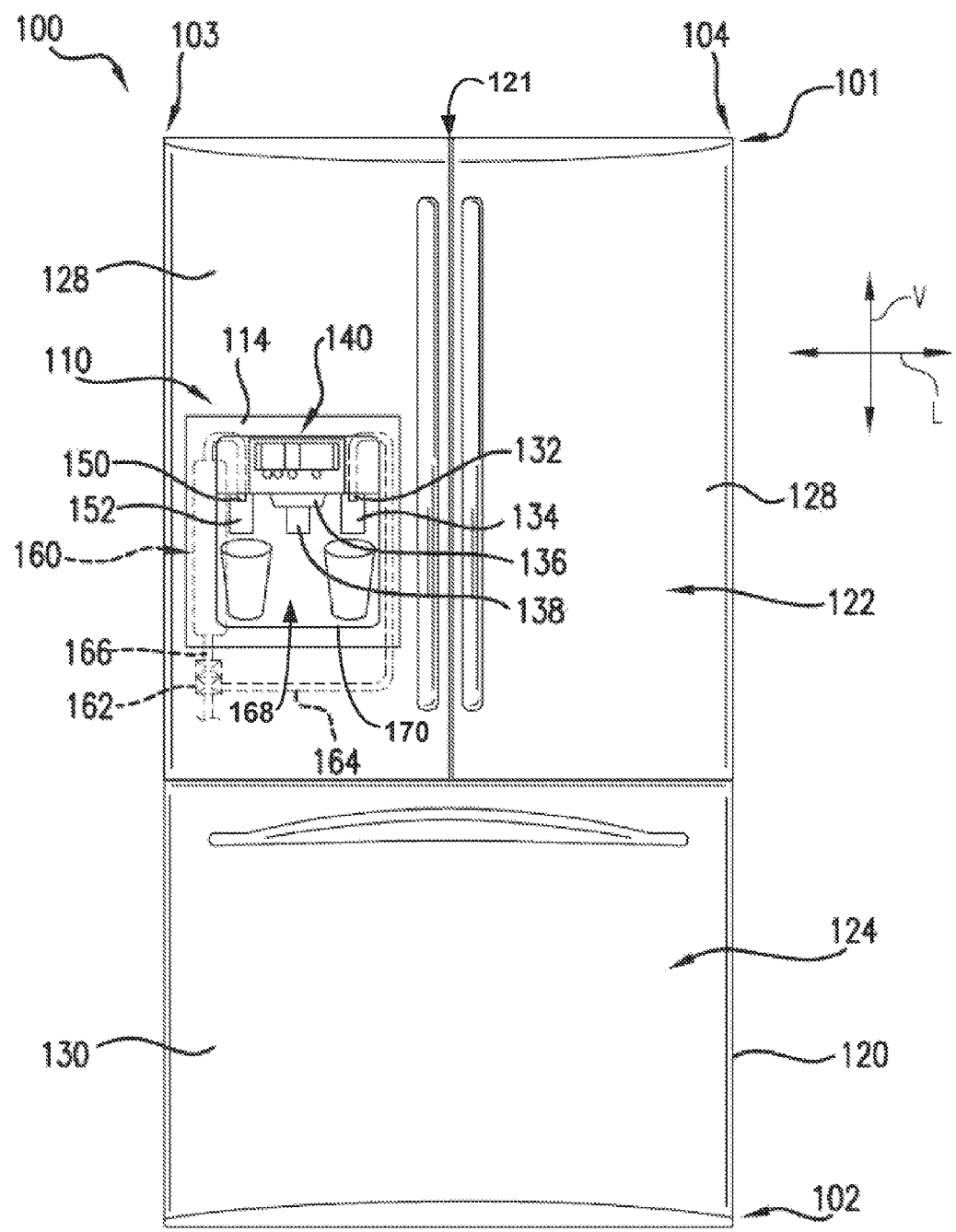
FIG. 1 provides a front, elevation view of a refrigerator appliance according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, elevation view of a refrigerator appliance 100 according to an exemplary embodiment of the present subject matter. Refrigerator appliance 100 includes a cabinet or housing 120. Housing 120 extends between an upper portion 101 and a lower portion 102 along a vertical direction V and also extends between a first side portion 103 and a second side portion 104 along a lateral direction L. Housing 120 defines chilled chambers, e.g., a fresh food compartment 122 positioned adjacent upper portion 101 of housing 120 and a freezer compartment 124 arranged at lower portion 102 of housing 120. Housing 120 also defines a mechanical compartment (not shown) for receipt of a sealed cooling system for cooling fresh food compartment 122 and freezer compartment 124.

Refrigerator appliance 100 is generally referred to as a bottom mount refrigerator appliance. However, it should be understood that refrigerator appliance 100 is provided by way of example only. Thus, the present subject matter is not limited to refrigerator appliance 100 and may be utilized in any suitable refrigerator appliance. For example, one of skill in the art will understand that the present subject matter may be used with side-by-side style refrigerator appliances or top mount refrigerator appliances as well.

Refrigerator doors 128 are rotatably hinged housing 120, e.g., at an opening 121 that permits access to fresh food compartment 122, in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

Refrigerator appliance 100 also includes a water-dispensing assembly 110 for dispensing liquid water and/or ice to a dispenser recess 168 defined on one of refrigerator doors 128. Water-dispensing assembly 110 includes a dispenser 114 positioned on an exterior portion of refrigerator appliance 100. Dispenser 114 includes several outlets for accessing ice, chilled liquid water, and heated liquid water. As will be understood by those skilled in the art, liquid water from a water source, such as a well or municipal water system, can contain additional substances or matter. Thus, as used herein, the term "water" includes purified water and solutions or mixtures containing water and, e.g., elements (such as calcium, chlorine, and fluorine), salts, bacteria, nitrates, organics, flavor additives and other chemical compounds or substances.

To access ice, chilled liquid water, and heated liquid water, water-dispensing assembly 110 includes a chilled water paddle 134 mounted below a chilled water outlet 132 for accessing chilled liquid water and a heated water paddle 152 mounted below a heated water outlet 150 for accessing heated liquid water. Similarly, an ice paddle 138 is mounted below an ice outlet 136 for accessing ice. As an example, a user can urge a vessel such as a cup against any of chilled water paddle 134, heated water paddle 152, and/or ice paddle 138 to initiate a flow of chilled liquid water, heated liquid water, and/or ice into the vessel within dispenser recess 168, respectively.

A control panel or user interface panel 140 is provided for controlling the mode of operation of dispenser 114, e.g., for selecting crushed or whole ice. In additional exemplary embodiments, refrigerator appliance 100 may include a single outlet and paddle rather than three separate paddles and dispensers. In such embodiments, user interface panel 140 can include a chilled water dispensing button (not labeled), an ice-dispensing button (not labeled), a heated water dispensing button (not labeled), and a steam-dispensing button (not labeled) for selecting between chilled liquid water, ice, heated liquid water, and steam, respectively.

Outlets 132, 136, and 150 and paddles 134, 138, and 152 are an external part of dispenser 114, and are positioned at or adjacent dispenser recess 168, e.g., a concave portion defined in an outside surface of refrigerator door 128. Dispenser 114 is positioned at a predetermined elevation convenient for a user to access ice or liquid water, e.g., enabling the user to access ice without the need to bend-over and without the need to access freezer compartment 124. In the exemplary embodiment, dispenser 114 is positioned at a level that approximates the chest level of a user.

Refrigerator appliance 100 also includes features for generating heated liquid water and/or steam and directing such heated liquid water and/or steam to dispenser recess 168. Thus, refrigerator appliance 100 need not be connected to a residential hot water heating system in order to supply heated liquid water and/or steam to dispenser recess 168. In particular, refrigerator appliance 100 includes a water heating assembly 160 mounted within refrigerator door 128 for heating water therein. Refrigerator appliance 100 includes a tee-joint 162 for splitting a flow of water. Tee-joint 162 directs water to both a heated water conduit 166 and a chilled water conduit 164.

Heated water conduit 166 is in fluid communication with water heating assembly 160 and heated water outlet 150. Thus, water from tee-joint 162 can pass through water heating assembly 160 and exit refrigerator appliance 100 at heated water outlet 150 as heated liquid water or steam. Conversely, chilled water conduit 164 is in fluid communication with chilled water outlet 132. Thus, water from tee-joint 162 can exit refrigerator appliance 100 as chilled liquid water at chilled water outlet 132. In alternative exemplary embodiments, chilled water conduit 164 and heated water conduit 166 are joined such that chilled and heated water conduits 164 and 166 are connected in parallel or in series to each other and dispense fluid at dispenser recess 168 from a common outlet.

Figure 2:
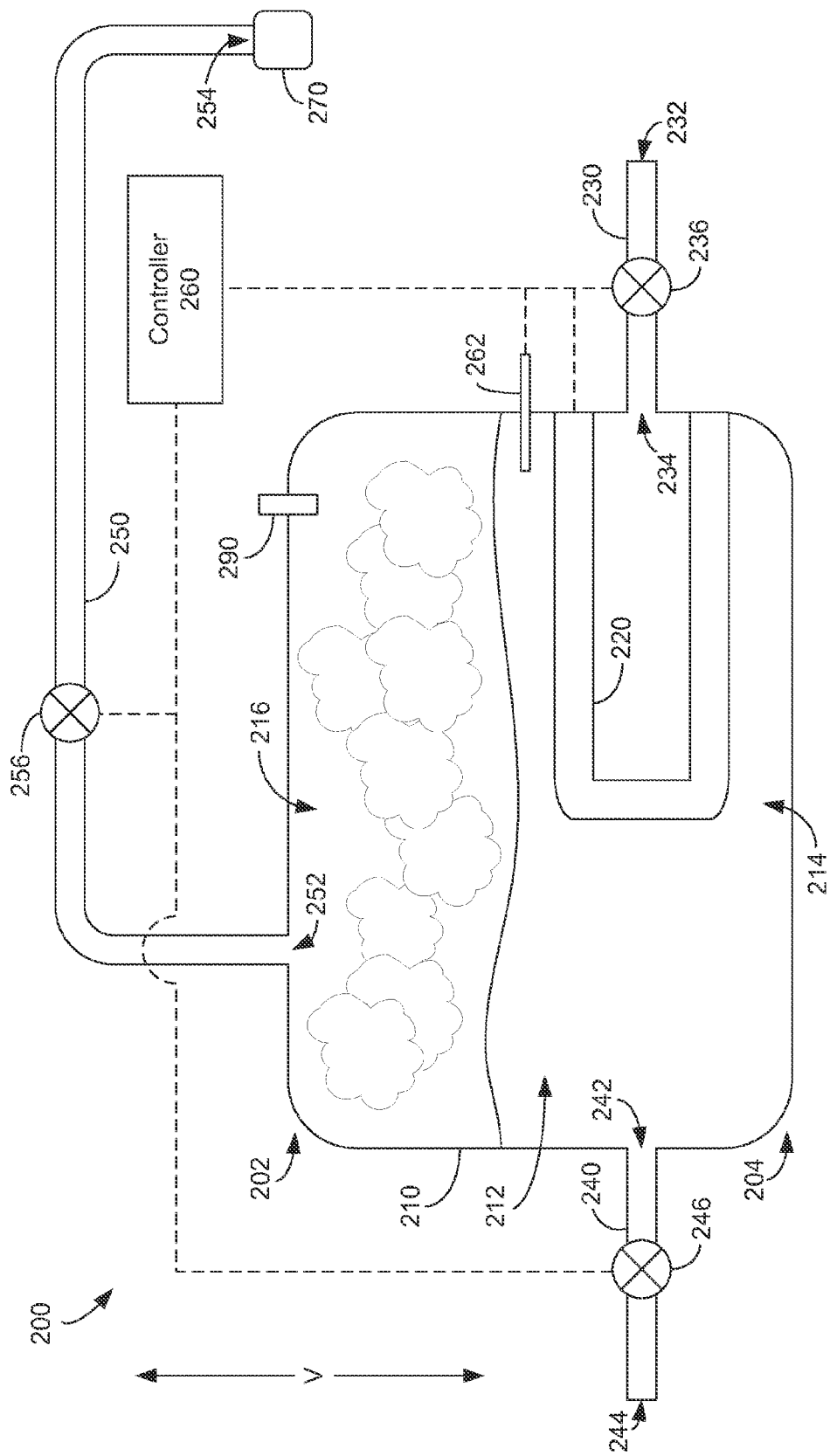
FIG. 2 provides a schematic view of a dispensing assembly according to an exemplary embodiment of the present subject matter.

FIG. 2 provides a schematic view of a dispensing assembly 200 according to an exemplary embodiment of the present subject matter. As discussed in greater detail below, dispensing assembly 200 is configured for generating and dispensing heated liquid water and steam in a refrigerator appliance. Dispensing assembly 200 can be used in any suitable refrigerator appliance. For example, dispensing assembly 200 may be used in refrigerator appliance 100 (FIG. 1) as water heating assembly 160.

As may be seen in FIG. 2, dispensing assembly 200 includes a reservoir or tank 210. Tank 210 defines a fluid chamber 212. As discussed in greater detail below, fluid chamber 212 is configured for receiving fluid, such as liquid water, and containing heated liquid water and/or steam during operation of a heating element 220 of dispensing assembly 200.

Heating element 220 is configured for heating fluid, such as liquid water, within fluid chamber 212 of tank 210. Heating element 220 may be mounted to tank 210 and positioned within or adjacent fluid chamber 212 of tank 210. Heating element 220 can be any suitable mechanism for heating fluid within fluid chamber 212 of tank 210. For example, heating element 220 may be an electric resistance heating element, a microwave heating element, a gas burner, or an induction heating element in certain exemplary embodiments.

Fluid chamber 212 of tank 210 includes or defines a first volume 214 and a second volume 216. First volume 214 of fluid chamber 212 is positioned below, e.g., along the vertical direction V, second volume 216 of fluid chamber 212. First volume 214 of fluid chamber 212 is configured for containing or holding liquid, such as liquid water, therein. Conversely, second volume 216 of fluid chamber 212 is configured for containing or holding gaseous fluid, such as steam, therein. Thus, fluid chamber 212 of tank 210 is configured for containing both gaseous fluids and liquids therein.

The first and second volumes 214 and 216 of fluid chamber 212 can have any suitable sizes relative to each other. In certain exemplary embodiments, first volume 214 of fluid chamber 212 is greater than second volume 216 of fluid chamber 212. In such exemplary embodiments, tank 210 can contain a larger volume of liquid relative to a volume of gaseous fluid.

Heating element 220 may be positioned within first volume 214 of fluid chamber 212. Thus, as shown in FIG. 2, heating element 220 may be disposed or immersed within liquid, such as liquid water, in first volume 214 of fluid chamber 212. As discussed in greater detail below, operation of heating element 220 can heat liquid water within first volume 214 of fluid chamber 212 in order to generate steam within second volume 216 of fluid chamber 212.

Dispensing assembly 200 also includes an inlet conduit 230, a first outlet conduit 240, and a second outlet conduit 250. Inlet conduit 230 is configured for directing liquid into fluid chamber 212 of tank 210. Inlet conduit 230 extends between an inlet or entrance 232 and an outlet or exit 234. Entrance 232 of inlet conduit 230 is in fluid communication with a water supply (not shown), such as a well or municipal water source. Exit 234 of inlet conduit 230 is mounted to tank 210 or positioned at or adjacent tank 210 such that exit 234 of inlet conduit 230 is in fluid communication with fluid chamber 212 of tank 210. Thus, liquid from water supply can flow through inlet conduit 230 into fluid chamber 212 of tank 210. In particular, water from water supply can flow through inlet conduit 230 into first volume 214 of fluid chamber 212.

First outlet conduit 240 is configured for directing liquid out of fluid chamber 212 of tank 210, e.g., to dispenser recess 168 of water-dispensing assembly 110 (FIG. 1). First outlet conduit 240 extends between an inlet or entrance 242 and an outlet or exit 244. Entrance 242 of first outlet conduit 240 is mounted to tank 210 or positioned at or adjacent tank 210 such that entrance 242 of first outlet conduit 240 is in fluid communication with fluid chamber 212 of tank 210. Exit 244 of first outlet conduit 240 is positioned at or adjacent dispenser recess 168 of water-dispensing assembly 110. Thus, water from tank 210 can flow through first outlet conduit 240 to dispenser recess 168 of water-dispensing assembly 110. In particular, liquid in first volume 214 of fluid chamber 212 can flow through first outlet conduit 240 to dispenser recess 168 of water-dispensing assembly 110. Thus, first volume 214 of fluid chamber 212 is in fluid communication with first outlet conduit 240 such that first outlet conduit 240 is configured for directing liquid water out of first volume 214 of fluid chamber 212.

Second outlet conduit 250 is configured for directing gas or gaseous fluid out of fluid chamber 212 of tank 210, e.g., to dispenser recess 168 of water-dispensing assembly 110 (FIG. 1). Second outlet conduit 250 extends between an inlet or entrance 252 and an outlet or exit 254. Entrance 252 of second outlet conduit 250 is mounted to tank 210 or positioned at or adjacent tank 210 such that entrance 252 of second outlet conduit 250 is in fluid communication with fluid chamber 212 of tank 210. Exit 254 of second outlet conduit 250 is positioned at or adjacent dispenser recess 168 of water-dispensing assembly 110. Thus, gaseous fluid from tank 210 can flow through second outlet conduit 250 to dispenser recess 168 of water-dispensing assembly 110. In particular, steam in second volume 216 of fluid chamber 212 can flow through second outlet conduit 250 to dispenser recess 168 of water-dispensing assembly 110. Thus, second volume 216 of fluid chamber 212 is in fluid communication with second outlet conduit 250 such that second outlet conduit 250 is configured for directing steam out of second volume 216 of fluid chamber 212. In certain exemplary embodiments, first and second outlets conduits 240 and 250 are joined such that first and second outlets conduits 240 and 250 are connected in parallel or in series to each other and dispense fluid at dispenser recess 168 from a common outlet.

As may be seen in FIG. 2, entrance 242 of first outlet conduit 240 is positioned below entrance 252 of second outlet conduit 250 along the vertical direction V. In particular, tank 210 extends between a top portion 202 and a bottom portion 204, e.g., along the vertical direction V. Entrance 242 of first outlet conduit 240 is positioned at or proximate bottom portion 204 of tank 210. Conversely, entrance 252 of second outlet conduit 250 is positioned at or proximate top portion 202 of tank 210. Heating element 220 is also positioned proximate bottom portion 204 of tank 210 within fluid chamber 212 of tank 210.

Dispensing assembly 200 also includes an inlet valve 236, a first outlet valve 246, and a second outlet valve 256. Inlet valve 236 is configured for regulating a flow of liquid through inlet conduit 230 into fluid chamber 212 of tank 210, e.g., into first volume 214 of fluid chamber 212. First outlet valve 246 is configured for regulating a flow of liquid through first outlet conduit 240 out of fluid chamber 212 of tank 210, e.g., out of first volume 214 of fluid chamber 212. Second outlet valve 256 is configured for regulating a flow of gas through second outlet conduit 250 out of fluid chamber 212 of tank 210, e.g., out of second volume 216 of fluid chamber 212.

In certain exemplary embodiments, dispensing assembly 200 need not include inlet valve 236. As will be understood by those skilled in the art, actuating first and second outlet valves 246 and 256 can regulate fluid flow into and out of fluid chamber 212 of tank 210 without inlet valve 236. In such exemplary embodiments, pressurized liquid water (from the water source) would not enter fluid chamber 212 of tank 210 until either first outlet valve 246 or second outlet valve 256 is opened to release pressure.

Inlet valve 236 and first and second outlet valves 246 and 256 can be any suitable mechanism for regulating fluid flow. For example, first outlet valve 246 may be a solenoid valve. As another example, second outlet valve 256 may be a solenoid valve or a spring-loaded check valve.

Inlet valve 236 and first and second outlet valves 246 and 256 can be mounted to any suitable component of dispenser assembly 200. For example, inlet valve 236 may be mounted to inlet conduit 230. Similarly, first outlet valve 246 may be mounted to first outlet conduit 240, and second outlet valve 256 may be mounted to second outlet conduit 250. Alternatively, inlet valve 236 and/or first and second outlet valves 246 and 256 may be mounted to tank 210.

As may be seen in FIG. 2, dispensing assembly 200 also includes a controller 260. Certain features or components of dispensing assembly 200 and/or refrigerator appliance 100 (FIG. 1) are controlled or operated by controller 260, e.g., according to user preferences selected via manipulation of control panel 140. Control panel 140 is in communication with or coupled to controller 260. In one exemplary embodiment, control panel 140 may represent a general purpose I/O ("GPIO") device or functional block. In another exemplary embodiment, control panel 140 may include input components, such as one or more of a variety of electrical, mechanical or electro-mechanical input devices including rotary dials, push buttons, and touch pads. Control panel 140 may be in communication with controller 260 via one or more signal lines or shared communication busses.

Controller 260 includes memory and one or more processing devices such as microprocessors, CPUs or the like, such as general or special purpose microprocessors operable to execute programming instructions or micro-control code associated with operation of refrigerator appliance 100 and/or dispensing assembly 200. The memory can represent random access memory such as DRAM, or read only memory such as ROM or FLASH. The processor executes programming instructions stored in the memory. The memory can be a separate component from the processor or can be included onboard within the processor. Alternatively, controller 260 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 260 is also in operative communication with heating element 220, inlet valve 236, and first and second outlet valves 246 and 256. Controller 260 is configured for selectively activating heating element 220 in order to heat fluid within fluid chamber 212 of tank 210. Controller 260 is also configured for selectively shifting inlet valve 236 between an open configuration and a closed configuration. Inlet valve 236 permits a flow of liquid through inlet conduit 230 into fluid chamber 212 of tank 210 when inlet valve 236 is in the open configuration. Conversely, inlet valve 236 hinders or obstructs the flow of liquid through inlet conduit 230 into fluid chamber 212 of tank 210 when inlet valve 236 is in the closed configuration.

Controller 260 is further configured for selectively adjusting first outlet valve 246 between an open configuration and a closed configuration. First outlet valve 246 permits a flow of liquid out of fluid chamber 212 of tank 210 through first outlet conduit 240 when first outlet valve 246 is in the open configuration. Conversely, first outlet valve 246 hinders or obstructs the flow of liquid out of fluid chamber 212 of tank 210 through first outlet conduit 240 when first outlet valve 246 is in the closed configuration.

Controller 260 is also configured for selectively switching second outlet valve 256 between an open configuration and a closed configuration. Second outlet valve 256 permits a flow of gas out of fluid chamber 212 of tank 210 through second outlet conduit 250 when second outlet valve 256 is in the open configuration. Conversely, second outlet valve 256 hinders or obstructs the flow of gas out of fluid chamber 212 of tank 210 through second outlet conduit 250 when second outlet valve 256 is in the closed configuration.

Dispenser assembly 200 also includes a temperature sensor 262. Temperature sensor 262 is configured for measuring a temperature of fluids, such as liquid water, within fluid chamber 212 of tank 210. Temperature sensor 262 can be any suitable device for measuring the temperature of fluids. For example, temperature sensor 262 may be a thermistor or a thermocouple. Controller 260 can receive a signal, such as a voltage or a current, from temperature sensor 262 that corresponds to the temperature of fluids within fluid chamber 212 of tank 210. In such a manner, the temperature of fluids within fluid chamber 212 of tank 210 can be monitored and/or recorded with controller 260.

As discussed in greater detail below, dispenser assembly 200 is configured for dispensing heated liquid water and/or steam. For example, dispenser assembly 200 can be configured to dispense heated liquid water and/or steam to dispenser recess 168 of refrigerator appliance 100 (FIG. 1).

Figure 3:
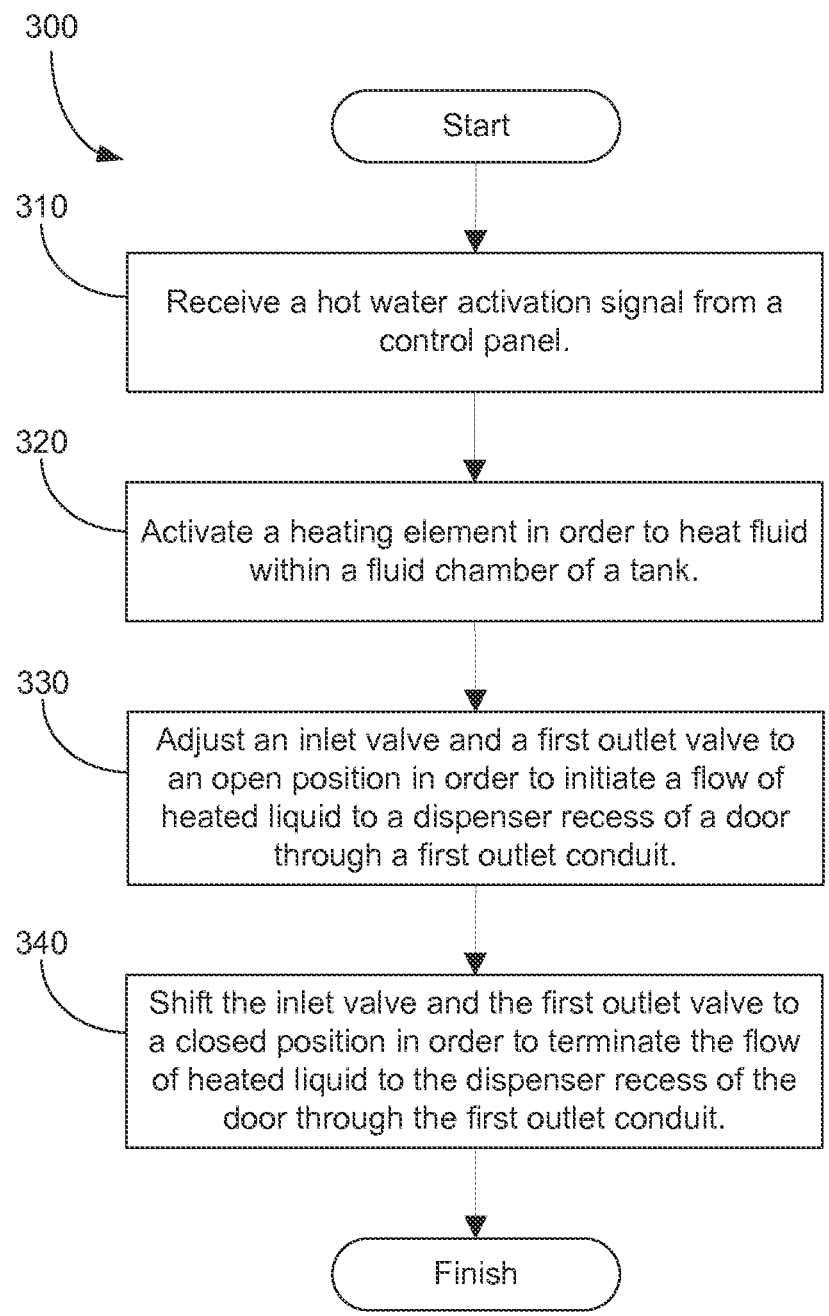
FIG. 3 illustrates a method of operating a dispensing assembly according to an exemplary embodiment of the present subject matter.

FIG. 3 illustrates a method 300 of operating dispensing assembly 200 according to an exemplary embodiment of the present subject matter. Controller 260 may be programmed to implement method 300. Utilizing method 300, controller 260 can dispense heated liquid water to dispenser recess 168 of refrigerator appliance 100.

As may be seen in FIG. 3, at step 310, controller 260 receives a hot water activation signal from control panel 140. As an example, a user can push a heated water dispensing button or other user input on control panel 140 in order to generate the hot water activation signal at step 310.

At step 320, controller 260 activates heating element 220 in order to heat fluid within fluid chamber 212 of tank 210 based at least in part on the hot water activation signal from step 310. As an example, controller 260 can operate heating element 220 at step 320 such that heating element 220 heats liquid within fluid chamber 212 of tank 210 to a preselected temperature. The preselected temperature can by any suitable temperature. For example, the preselected temperature may be between about one-hundred and forty degrees Fahrenheit and two hundred degrees Fahrenheit in certain exemplary embodiments. The preselected temperature can also be selected such that liquid water within first volume 214 of fluid chamber 212 does not boil and generate steam in second volume 216 of fluid chamber 212 at step 320. Thus, in certain exemplary embodiments, the preselected temperature can be any temperature below the boiling point of water.

At step 330, controller 260 adjusts inlet valve 236 and first outlet valve 246 to the open configuration. By opening inlet valve 236 and first outlet valve 246, a flow of heated liquid is initiated to dispenser recess 168 through first outlet conduit 240. In particular, heated liquid water can flow from first volume 214 of fluid chamber 212 into first outlet conduit 240 when inlet valve 236 and first outlet valve 246 are in the open configuration. Within the dispenser recess 168, heated liquid water can flow into a container within dispenser recess 168. With inlet valve 236 in the open configuration at step 330, liquid water from an associated water source can flow into fluid chamber 212 of tank 210 through inlet conduit 230, e.g., in order to replace liquid water flowing out of fluid chamber 212 to dispenser recess 168. Second outlet valve 256 can remain closed at step 330 such that gas within fluid chamber 212 remains within fluid chamber 212.

At step 340, controller 260 shifts inlet valve 236 and first outlet valve 246 to the closed configuration. With inlet valve 236 and first outlet valve 246 in the closed configuration, the flow of heated liquid to dispenser recess 168 through first outlet conduit 240 is terminated. As an example, when the container in dispenser recess 168 is full or after a particular volume of heated liquid water has been dispensed, controller 260 can terminate the flow of heated liquid water from first volume 214 of fluid chamber 212 into first outlet conduit 240 at step 340. In such a manner dispenser assembly 200 can dispense a volume of heated liquid water to dispenser recess 168.

Figure 4:
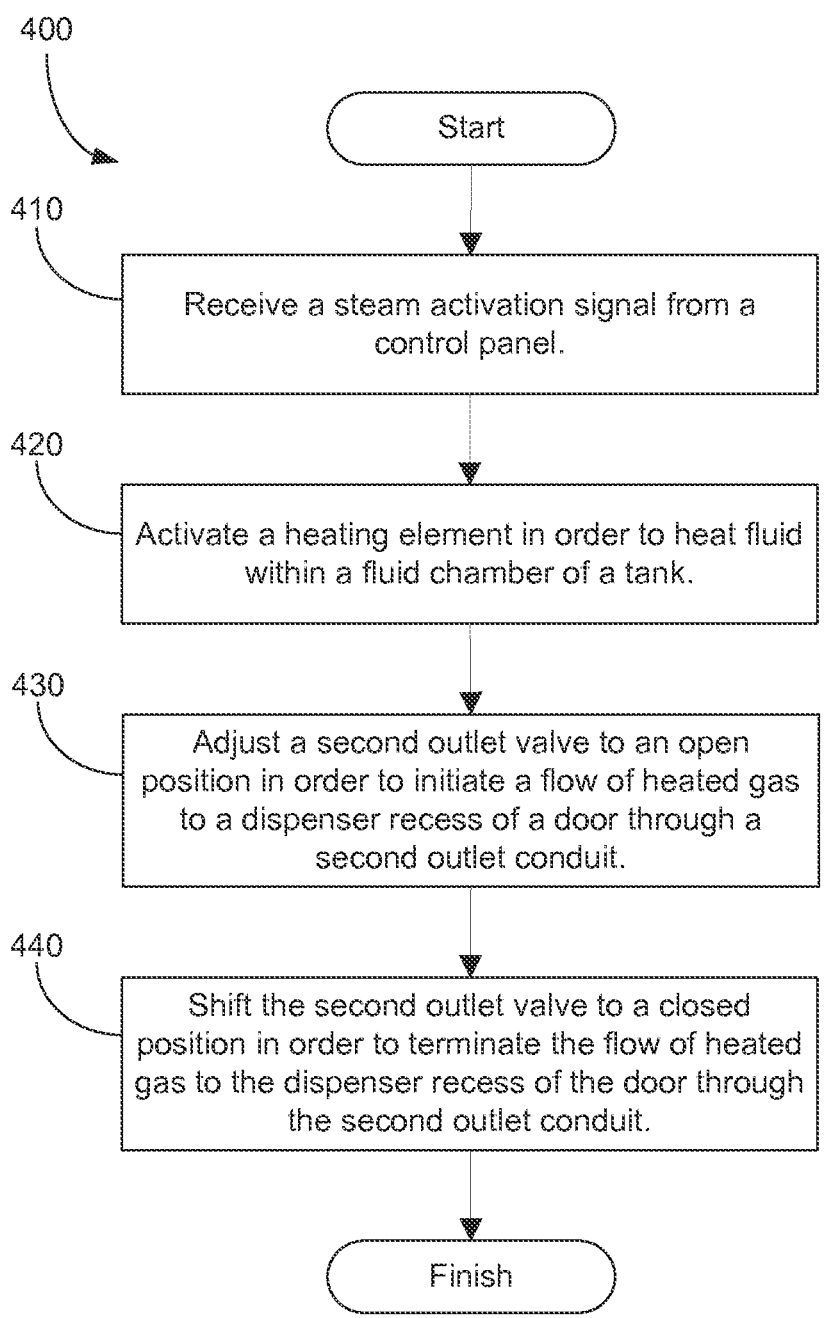
FIG. 4 illustrates a method of operating a dispensing assembly according to an additional exemplary embodiment of the present subject matter.

FIG. 4 illustrates a method 400 of operating dispensing assembly 200 according to an additional exemplary embodiment of the present subject matter. Controller 260 may be programmed to implement method 400. Utilizing method 400, controller 260 can dispense steam to dispenser recess 168 of refrigerator appliance 100.

As may be seen in FIG. 4, at step 410, controller 260 receives a steam activation signal from control panel 140. As an example, a user can push a steam dispensing button or other user input on control panel 140 in order to generate the steam activation signal at step 410.

At step 420, controller 260 activates heating element 220 in order to heat fluid within fluid chamber 212 of tank 210 based at least in part on the steam activation signal from step 410. As an example, controller 260 can operate heating element 220 at step 420 such that heating element 220 heats liquid within fluid chamber 212 of tank 210 to a predetermined temperature. The predetermined temperature can by any suitable temperature. For example, the predetermined temperature can be selected such that liquid water within first volume 214 of fluid chamber 212 boils and generates steam in second volume 216 of fluid chamber 212 at step 420. Thus, in certain exemplary embodiments, the predetermined temperature can be any temperature at or above the boiling point of water.

At step 430, controller 260 adjusts second outlet valve 256 to the open configuration. By opening second outlet valve 256 at step 430, a flow of heated gas can be initiated through second outlet conduit 250 to dispenser recess 168. In particular, steam from second volume 216 of fluid chamber 212 can flow through second outlet conduit 250 to dispenser recess 168 with second outlet valve 256 in the open configuration. Inlet valve 236 and first outlet valve 246 can remain in the closed configuration at step 430 in order to prevent liquid water from flowing into or out of fluid chamber 212 of tank 210 at step 430.

Steam from second outlet conduit 250 can be used for any suitable purpose at step 430. For example, certain coffee drinks use steamed milk. Thus, steam from second outlet conduit 250 can be directed into a container having milk therein at step 430 in order to assist with steaming such milk. Alternatively, the container can be a baby bottle, and steam from second outlet conduit 250 can be directed into the baby bottle at step 430 in order to assist with cleaning or sanitizing the baby bottle. The examples provided above are not intended to limit the present subject matter, and, as discussed above, steam from second outlet conduit 250 can be used for any suitable purpose at step 430.

At step 440, controller 260 shifts second outlet valve 256 to the closed configuration. With second outlet valve 256 in the closed configuration, the flow of heated gas through second outlet conduit 250 to dispenser recess 168 is terminated. As an example, when a container in dispenser recess 168 has been sanitized or after milk within the container has been steamed, controller 260 can terminate the flow of steam from second volume 216 of fluid chamber 212 into second outlet conduit 250 at step 440. In such a manner dispenser assembly 200 can dispense steam to dispenser recess 168.

Turning back to FIG. 2, dispenser assembly 200 also includes a nozzle 270. Nozzle 270 is positioned at exit 254 of second outlet conduit 250 and is in fluid communication with second outlet conduit 250. In particular, nozzle 270 is configured for receiving gas, such as steam, from second volume 216 of fluid chamber 212 via second outlet conduit 250.

In certain exemplary embodiments, nozzle 270 may be positioned within dispenser recess 168 (FIG. 1) of refrigerator appliance 100. Nozzle 270 may be rotatably or slidably mounted within dispenser recess 168 such that nozzle 270 is configured for placement within a container. As will be understood by those skilled in the art, nozzle 270 can be configured for steaming milk within the container.

Dispenser assembly 200 further includes an overpressure valve 290. Overpressure valve 290 is mounted to tank 210 and is positioned at or adjacent top portion 202 of tank 210. Overpressure valve 290 vents fluid chamber 212 of tank 210, e.g., when pressure within fluid chamber 212 exceeds a threshold pressure. Thus, overpressure valve 290 can limit or prevent pressure within tank 210 from exceeding the threshold pressure.

In certain exemplary embodiments, refrigerator appliance 100 can also include a shield 170 (shown schematically in FIG. 1). Shield 170 is mounted to refrigerator door 128 at dispenser recess 168. Shield 170 selectively seals dispenser recess 168 in order to assist steam from second outlet conduit 250 with sanitizing dispenser recess 168, e.g., by containing such steam within dispenser recess 168.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
    a cabinet defining a chilled chamber for receiving food or beverage items for storage, the cabinet also defining an opening for accessing the chilled chamber;
    a door mounted to the cabinet at the opening of the cabinet, the door defining a dispenser recess; and
    a dispensing assembly comprising
        a tank defining a fluid chamber;
        a heating element configured for heating fluid within the fluid chamber of the tank;
        an inlet conduit configured for directing liquid into the fluid chamber of the tank;
        a first outlet conduit extending between the tank and the dispenser recess of the door, the first outlet conduit configured for directing liquid out of the fluid chamber of the tank to the dispenser recess of the door;
        a first outlet valve coupled to the first outlet conduit, the first outlet valve configured for regulating a flow of liquid through the first outlet conduit out of the fluid chamber of the tank;
        a second outlet conduit extending between the tank and the dispenser recess of the door, the second outlet conduit configured for directing gas out of the fluid chamber of the tank to the dispenser recess of the door;
        a second outlet valve coupled to the second outlet conduit, the second outlet valve configured for regulating a flow of gas through the second outlet conduit out of the fluid chamber of the tank.

2. The refrigerator appliance of claim 1, further comprising a controller in operative communication with the heating element and the first and second outlet valves, the controller configured for
    selectively activating the heating element in order to heat fluid within the fluid chamber of the tank;
    selectively adjusting the first outlet valve between an open configuration and a closed configuration, the first outlet valve permitting the flow of liquid through the first outlet conduit out of the fluid chamber of the tank to the dispenser recess of the door when the first outlet valve is in the open configuration, the first outlet valve hindering the flow of liquid through the first outlet conduit out of the fluid chamber of the tank when the first outlet valve is in the closed configuration; and
    selectively switching the second outlet valve between an open configuration and a closed configuration, the second outlet valve permitting the flow of gas through the second outlet conduit out of the fluid chamber of the tank to the dispenser recess of the door when the second outlet valve is in the open configuration, the second outlet valve hindering the flow of gas through the second outlet conduit out of the fluid chamber of the tank when the second outlet valve is in the closed configuration.

3. The refrigerator appliance of claim 2, further comprising a control panel having at least one user input, the controller being in communication with the control panel.

4. The refrigerator appliance of claim 3, wherein the controller is configured for:
    receiving a hot water activation signal from the control panel;

activating the heating element in order to heat fluid within the fluid chamber of the tank based at least in part on the hot water activation signal from said step of receiving;

adjusting the first outlet valve to the open position in order to initiate a flow of heated liquid to the dispenser recess of the door through the first outlet conduit; and shifting the first outlet valve to the closed position in order to terminate the flow of heated liquid to the dispenser recess of the door through the first outlet conduit.

5. The refrigerator appliance of claim 3, wherein the controller is configured for:

receiving a steam activation signal from the control panel;

activating the heating element in order to heat fluid within the fluid chamber of the tank based at least in part on the steam activation signal from said step of receiving;

adjusting the second outlet valve to the open position in order to initiate a flow of heated gas to the dispenser recess of the door through the second outlet conduit; and shifting the second outlet valve to the closed position in order to terminate the flow of heated gas to the dispenser recess of the door through the second outlet conduit.

6. The refrigerator appliance of claim 1, further comprising a nozzle positioned within the dispenser recess of the door, the nozzle being in fluid communication with the second outlet conduit and configured for receiving gas from the second outlet conduit.

7. The refrigerator appliance of claim 6, wherein the nozzle is rotatably or slidably mounted within the dispenser recess of the door such that the nozzle is configured for placement within a container.

8. The refrigerator appliance of claim 1, wherein the second outlet valve comprises a solenoid valve or a spring-loaded check valve.

9. The refrigerator appliance of claim 1, wherein the first outlet valve comprises a solenoid valve.

10. The refrigerator appliance of claim 1, further comprising a shield mounted to the door at the dispenser recess of the door, the shield selectively sealing the dispenser recess of the door in order to assist gas from the second conduit with sanitizing the dispenser recess of the door.

* * * * *